E. D. ANDERSON.
MULTIPLE CARTONING MACHINE.
APPLICATION FILED DEC. 29, 1917.
1,313,975.
Patented Aug. 26, 1919.
10 SHEETS—SHEET 6.
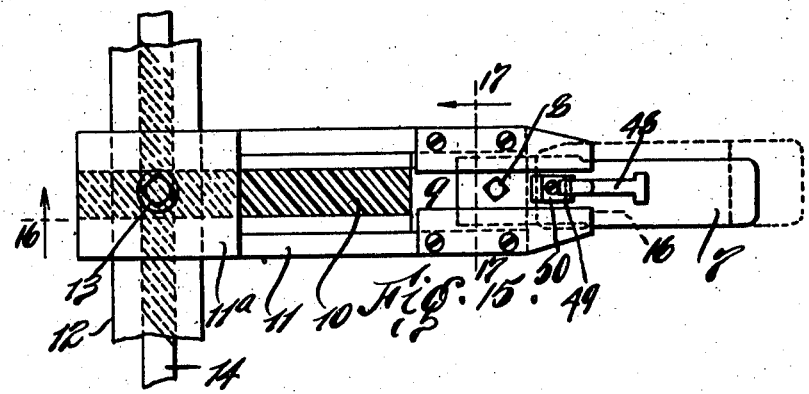
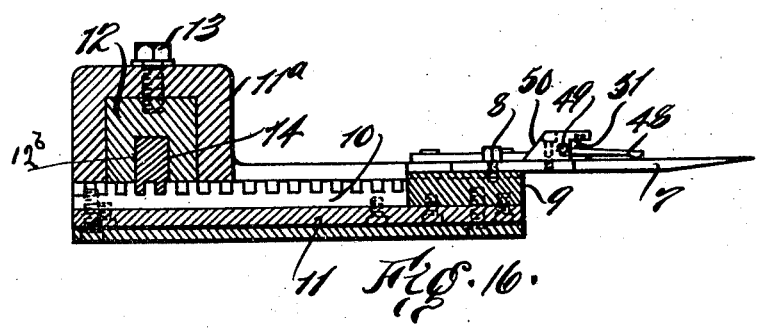
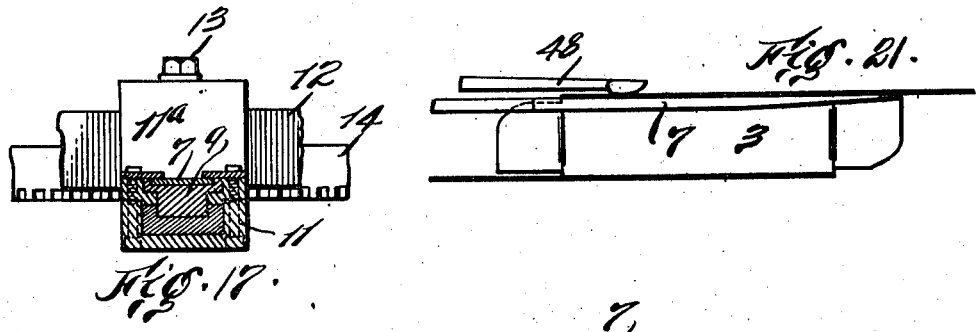
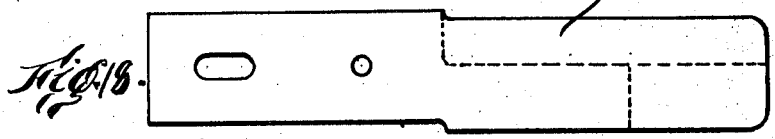
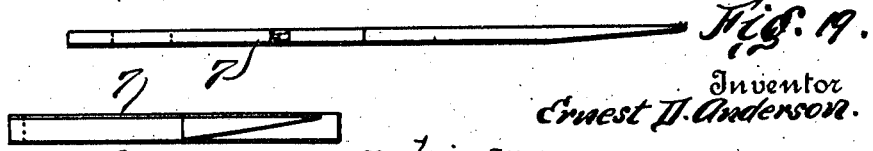
Inventor
Ernest D. Anderson.
By his Attorney
D. F. Bourne

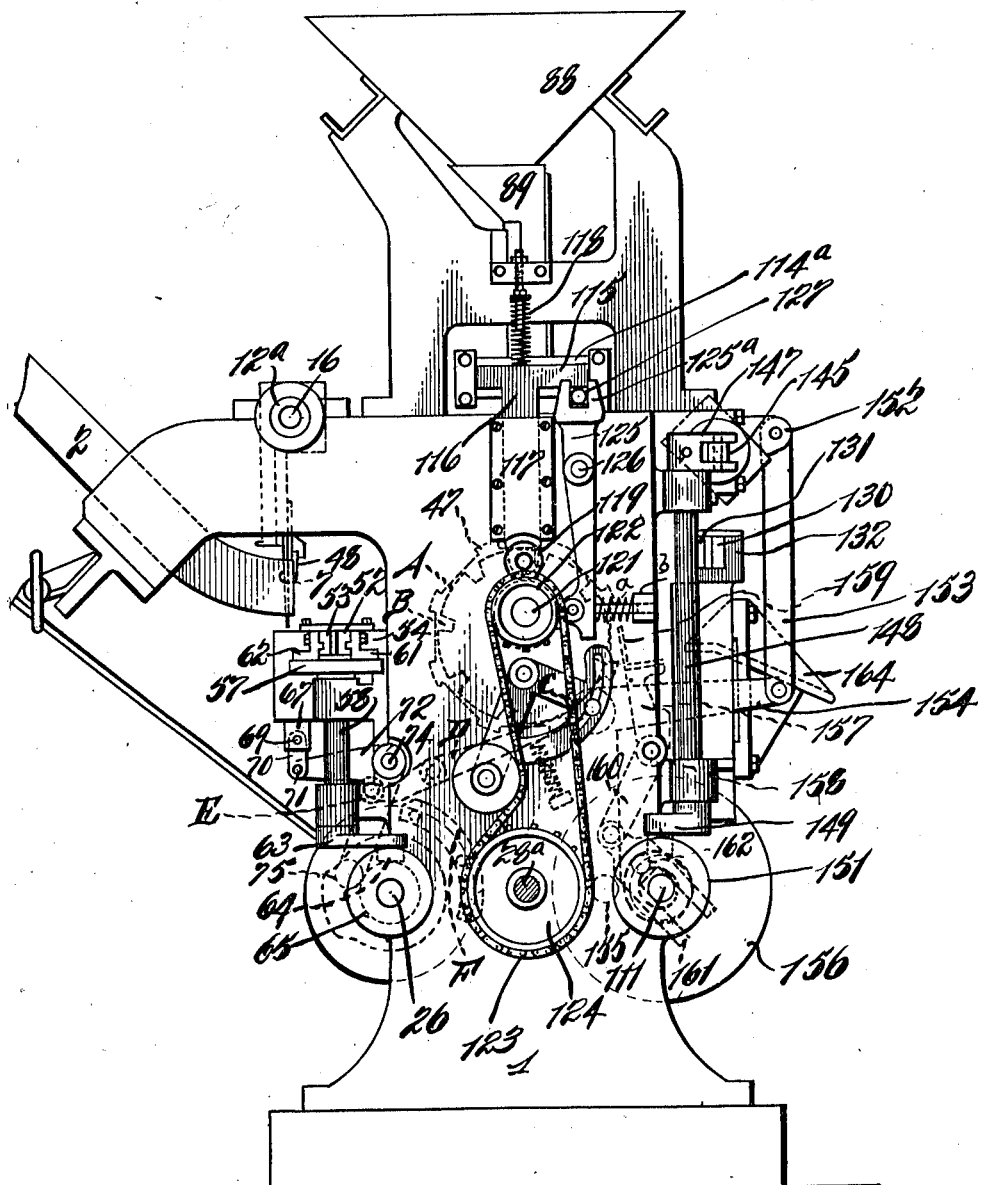

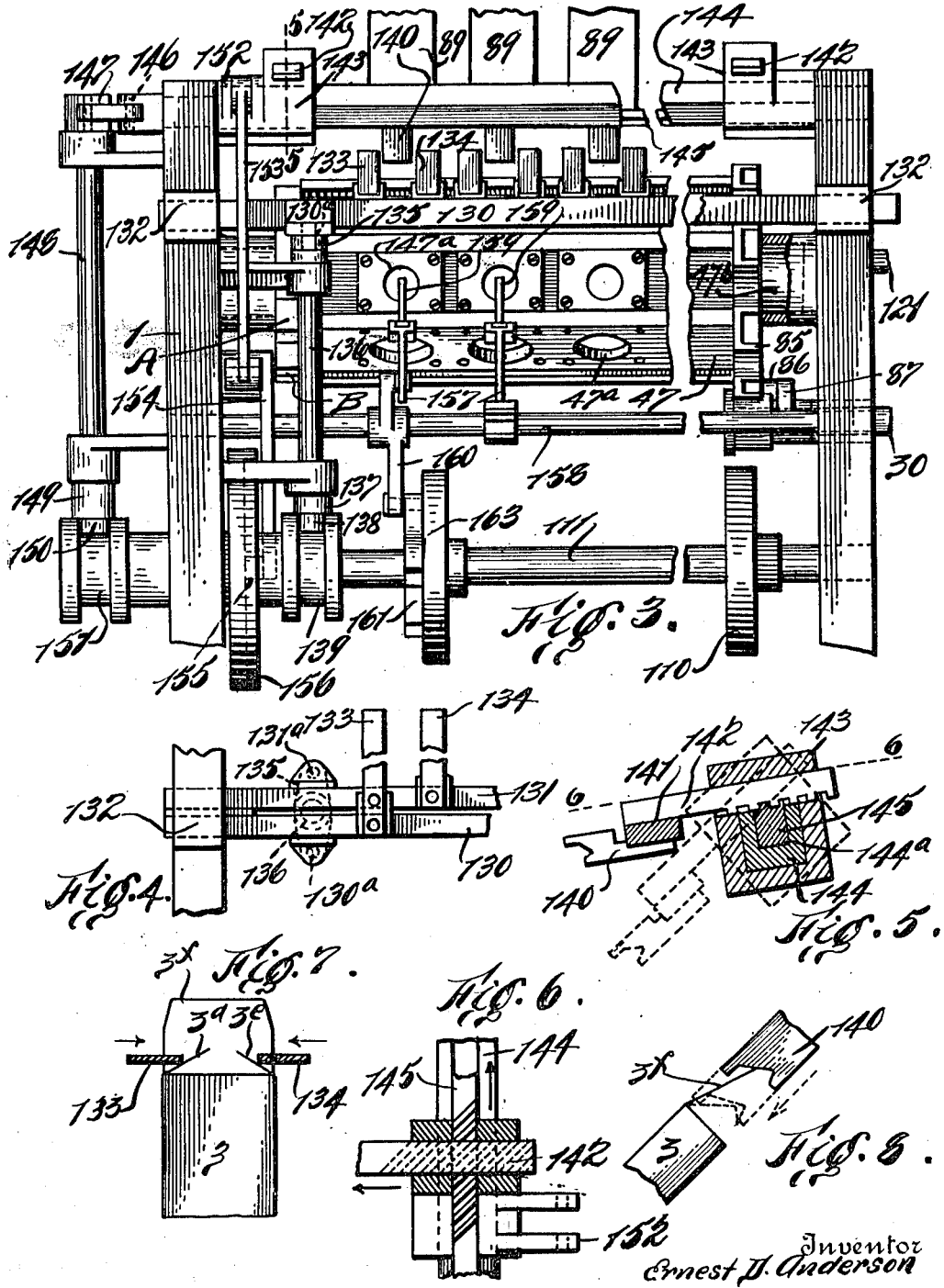

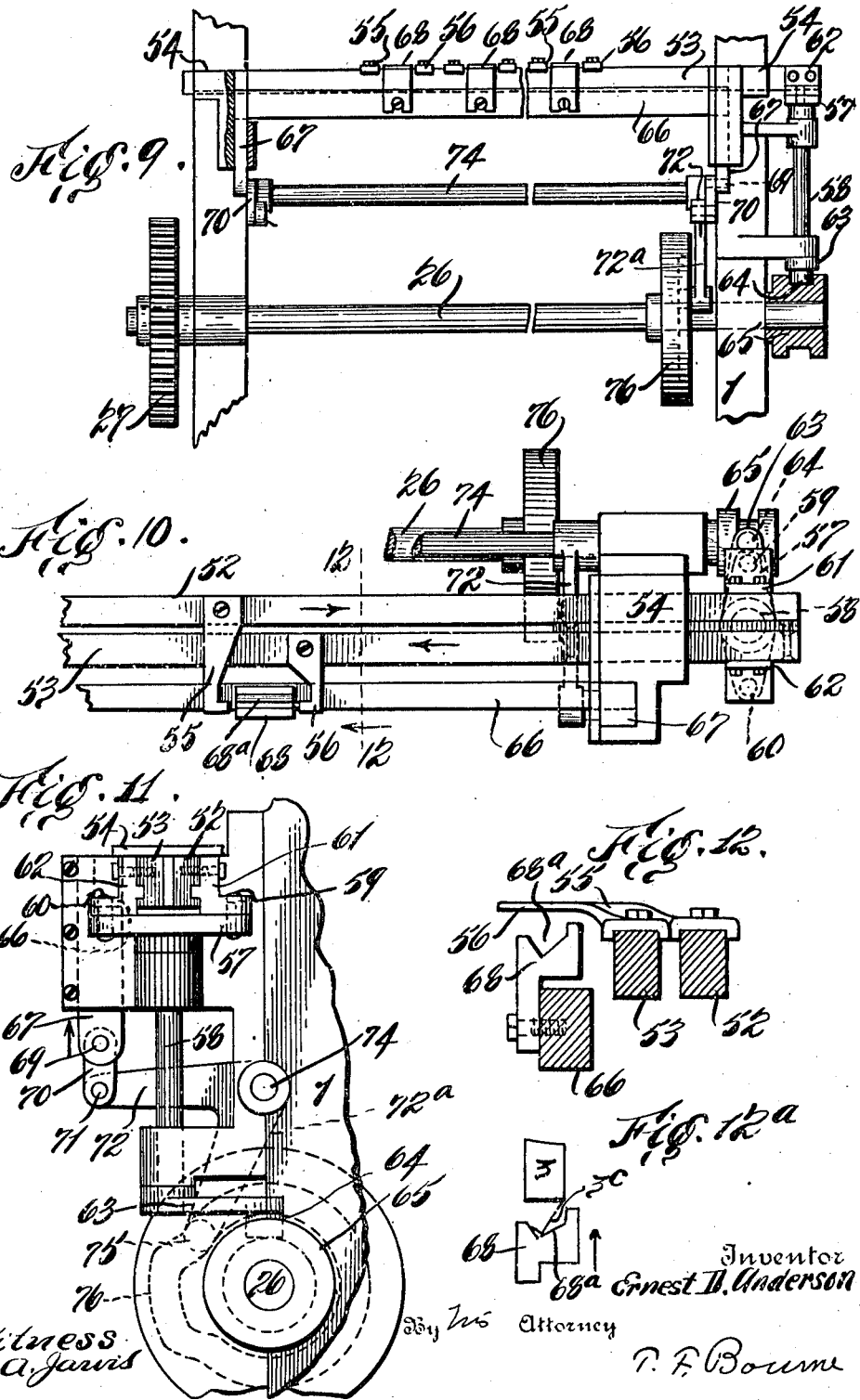

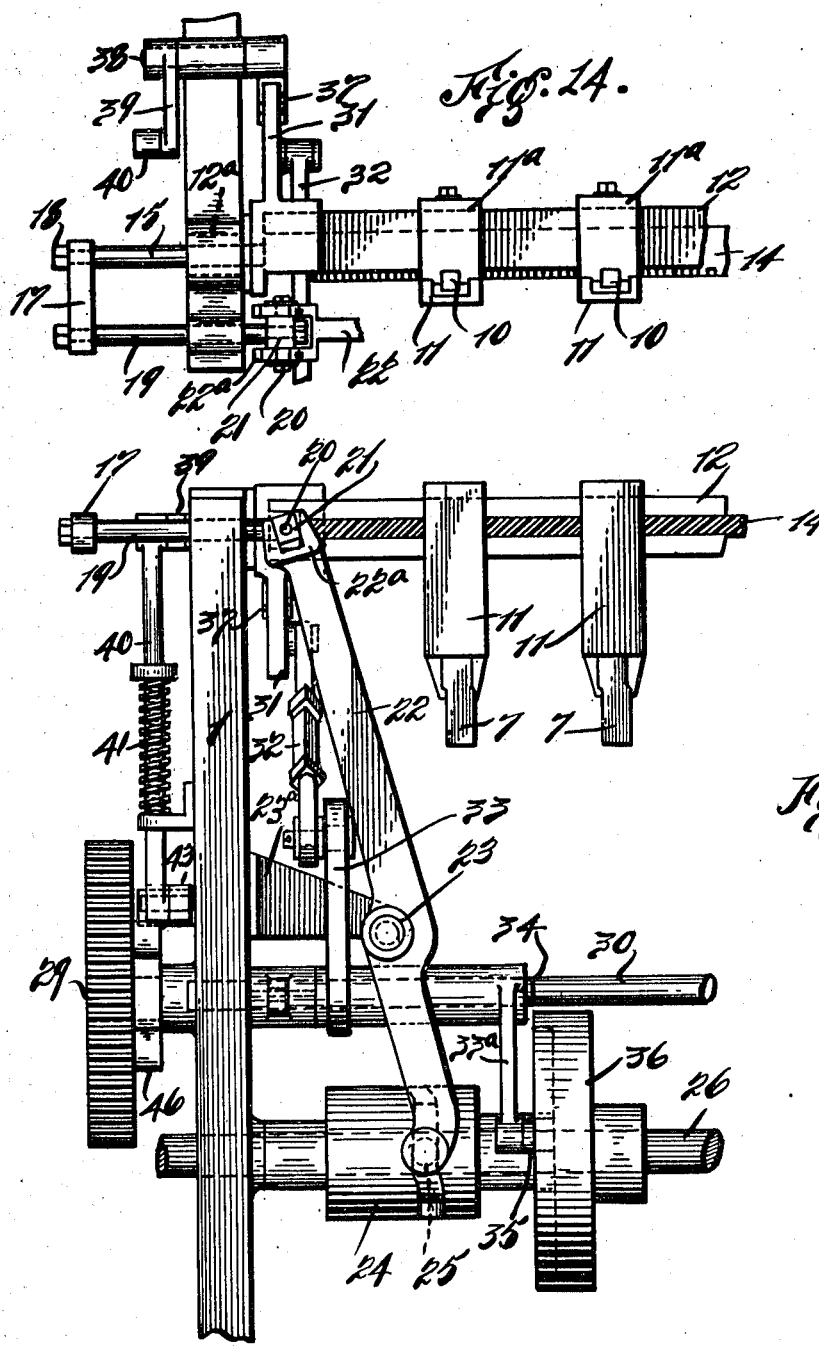

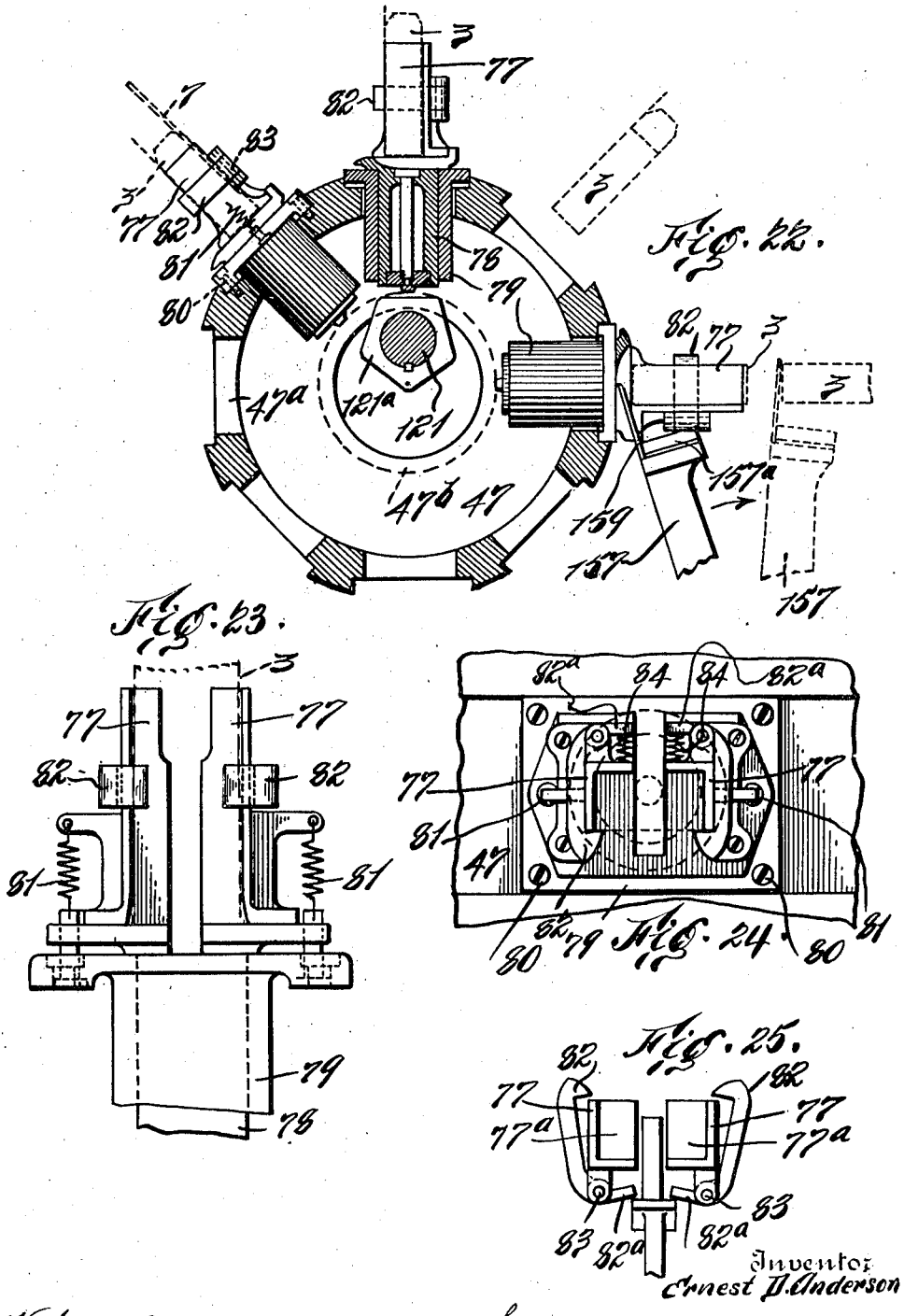

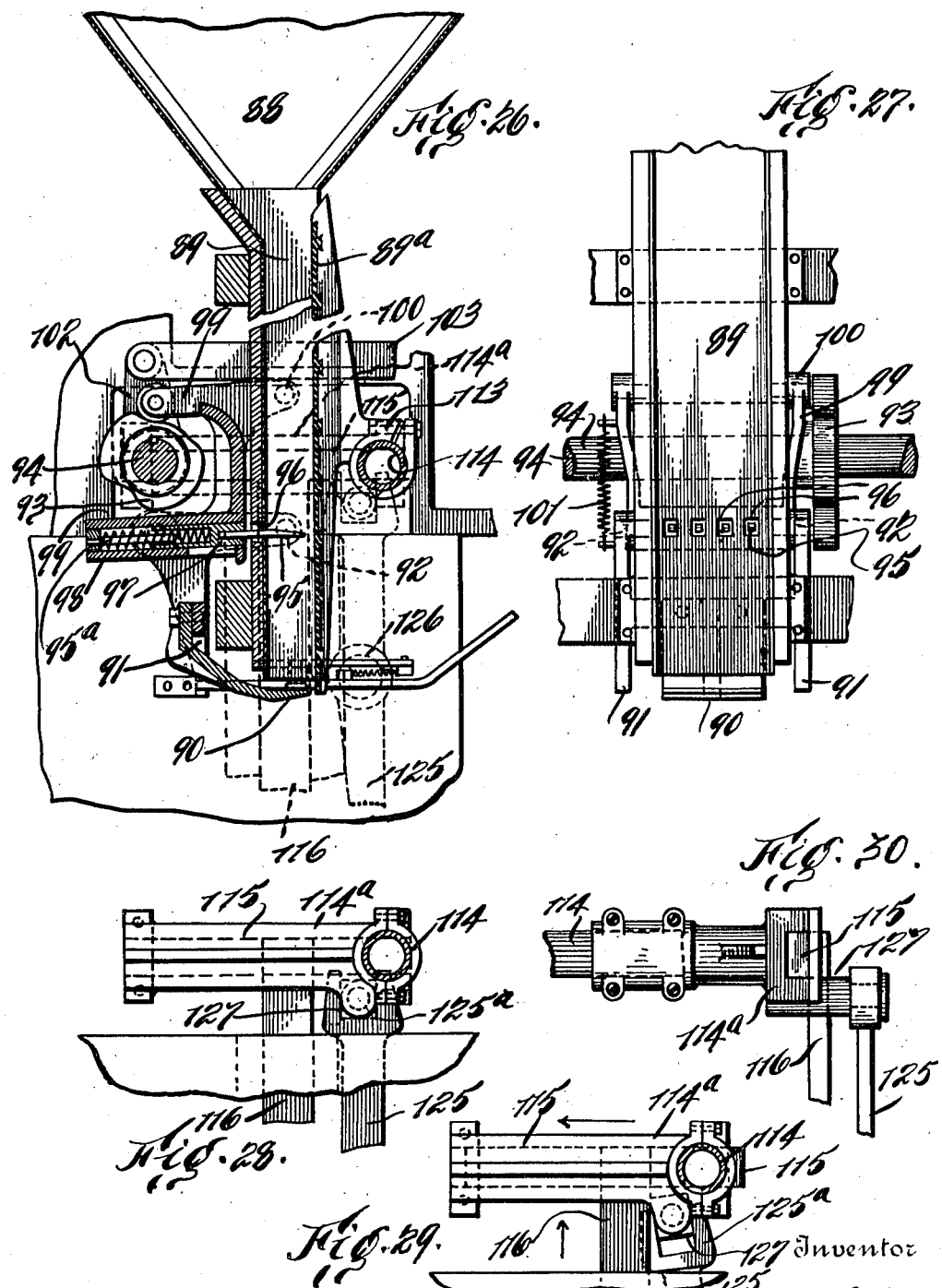

E. D. ANDERSON.
MULTIPLE CARTONING MACHINE.
APPLICATION FILED DEC. 29, 1917.

1,313,975.

Patented Aug. 26, 1919.
10 SHEETS—SHEET 9.

Witness
E. A. Jarvis

Inventor
Ernest D. Anderson
By his Attorney
T. F. Bourne

E. D. ANDERSON.
MULTIPLE CARTONING MACHINE.
APPLICATION FILED DEC. 29, 1917.
1,313,975.
Patented Aug. 26, 1919.
10 SHEETS—SHEET 10.
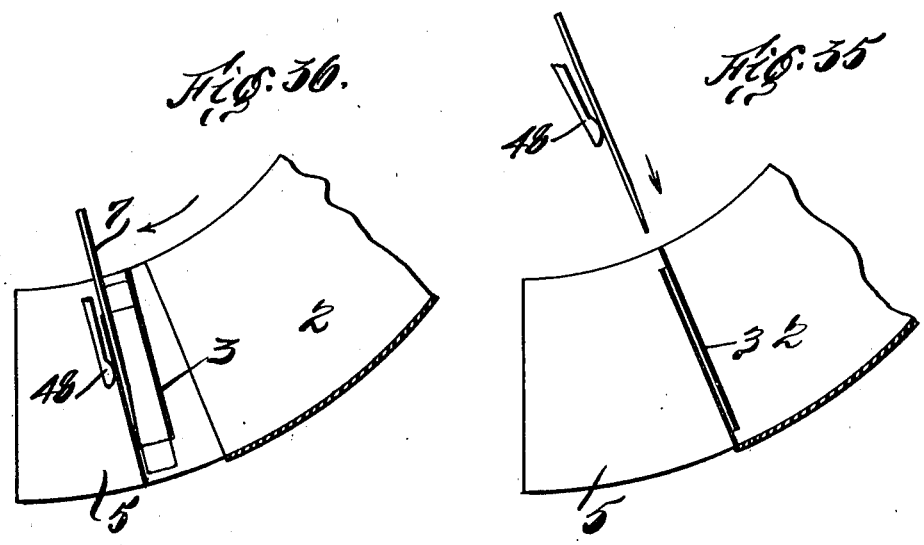
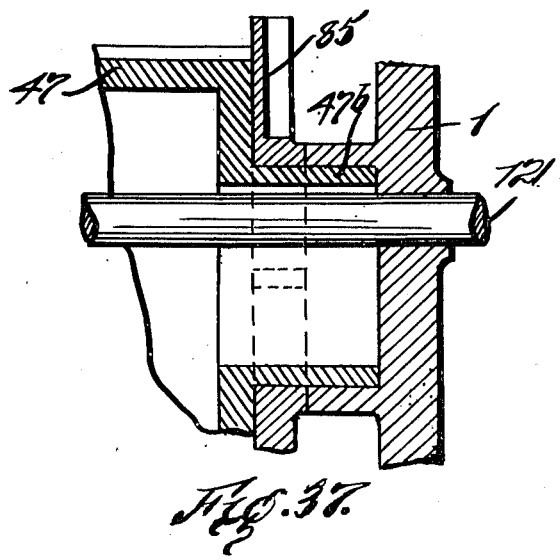
Inventor
Ernest D. Anderson.
By his Attorney
P. F. Bourne

UNITED STATES PATENT OFFICE.

ERNEST D. ANDERSON, OF NEW YORK, N. Y.

MULTIPLE-CARTONING MACHINE.

1,313,975.  Specification of Letters Patent.  Patented Aug. 26, 1919.

Application filed December 29, 1917. Serial No. 209,481.

*To all whom it may concern:*

Be it known that I, ERNEST D. ANDERSON, a citizen of the United States, and resident of New York city, borough of Manhattan, in the county of New York and State of New York, have invented certain new and useful Improvements in Multiple-Cartoning Machines, of which the following is a specification.

The object of my invention is to provide a machine adapted for packing or charging a plurality of receptacles or cartons simultaneously in a successive manner, including the simultaneous opening of receptacles or cartons having flaps and the simultaneous closing of certain flaps thereof, such opening of several receptacles or cartons and simultaneous closing of their flaps being carried out in a successive manner, whereby several receptacles or cartons will be ready simultaneously to receive the aforesaid charges, a further object being to simultaneously close the remaining flaps of the several simultaneously-charged receptacles or cartons, whereby several charged and closed receptacles may be simultaneously discharged from the machine, and so on successively.

In carrying out my invention I provide means to supply simultaneously two or more receptacles; means to simultaneously open receptacles from such supplies, means to simultaneously close flaps at one end of the several opened receptacles, means to simultaneously place such open receptacles in position for charging, means to simultaneously charge such opened receptacles, and means to simultaneously close remaining flaps of such charged receptacles, the several aforesaid means being adapted to operate in a successive manner for the several required steps with regard to the said several receptacles.

Figure 1:
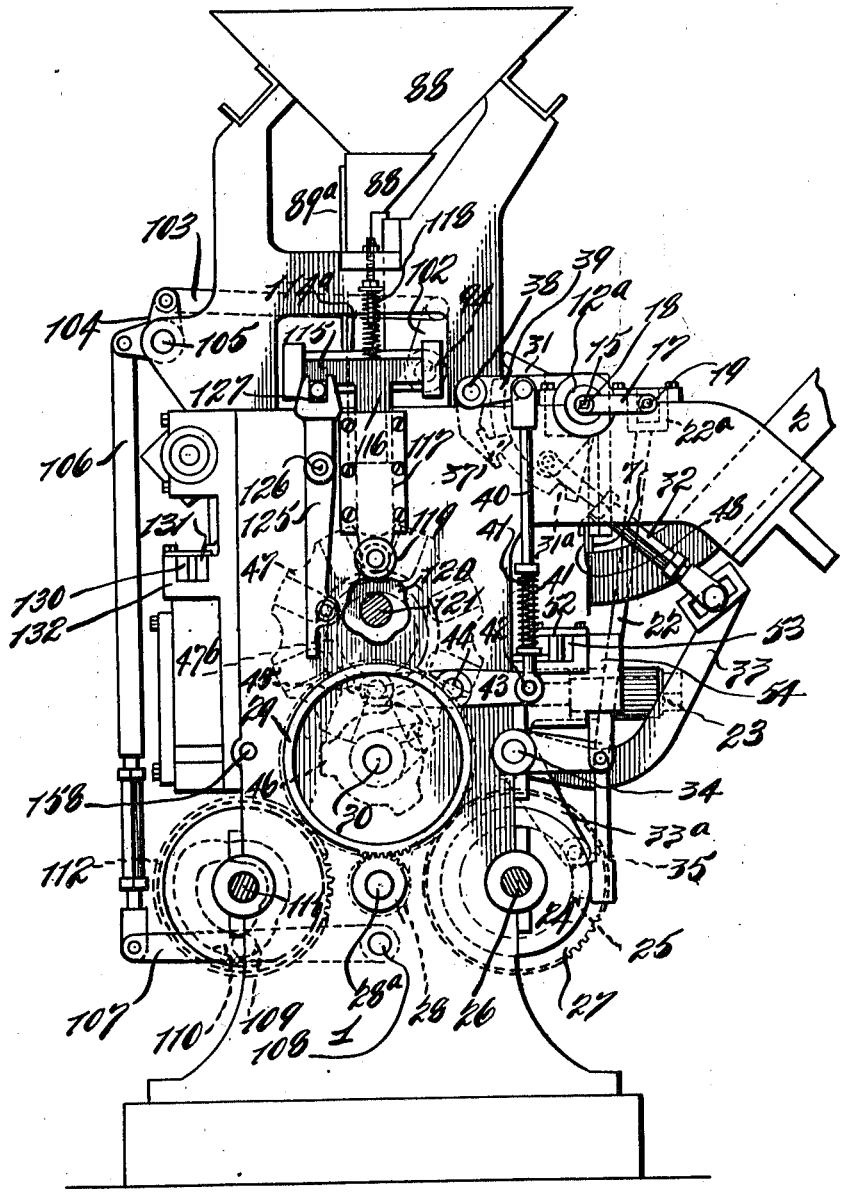
Figure 31:
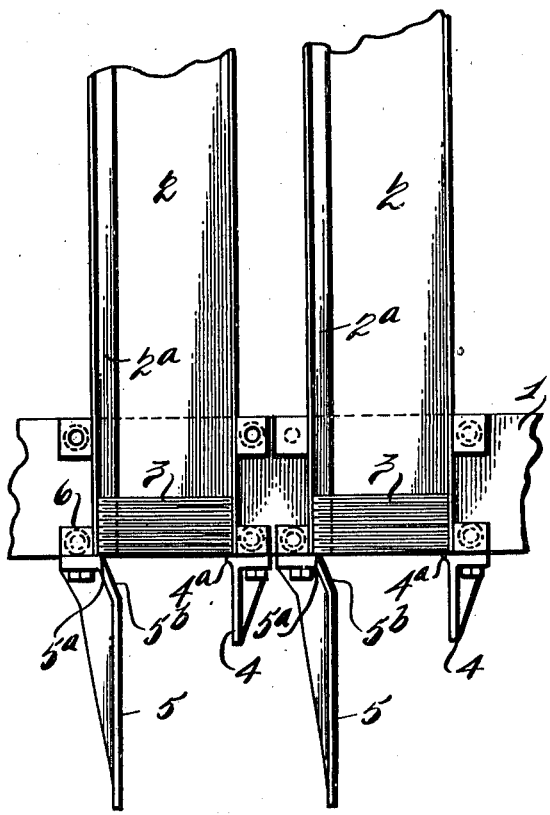
Figure 34:
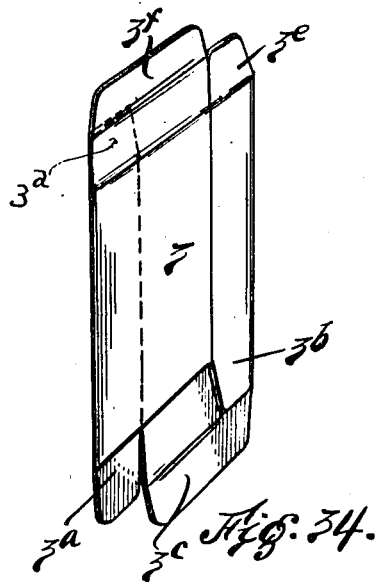
Figure 33:
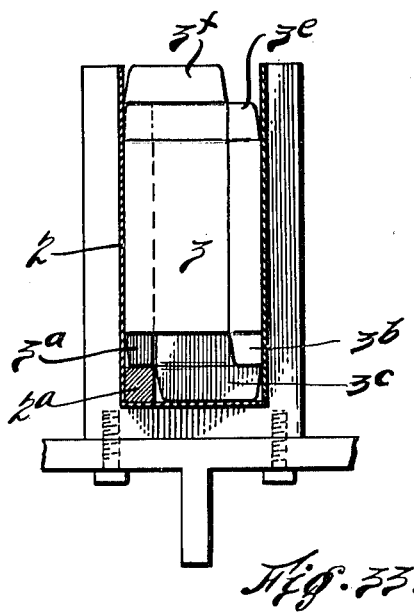
Figure 32:
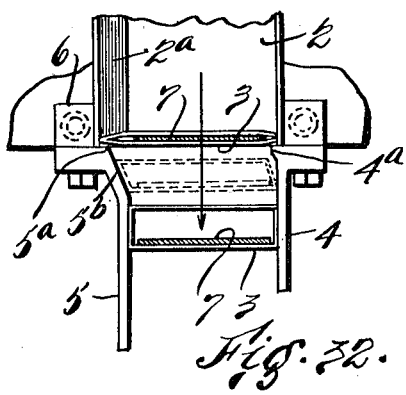

Reference is to be had to the accompanying drawings forming part hereof, wherein, Figure 1 is a side elevation of one end of a machine embodying my invention; Fig. 2 is a similar view looking at the opposite end of the machine; Fig. 3 is an enlarged fragmentary side view of a portion of the machine looking from the righthand side in Fig. 2, illustrating flap closing and tucking mechanism at the tops of receptacles, and also ejectors for the charged and closed receptacles; Fig. 4 is a fragmentary plan view, illustrating the top side flap closers for receptacles; Fig. 5 is a section on the line 5, 5, in Fig. 3, illustrating means for operating top end flap tuckers; Fig. 6 is a section on the line 6, 6, in Fig. 5; Fig. 7 is a diagrammatic view illustrating the side flap closers coöperative with such flaps of a receptacle; Fig. 8 is a diagrammatic view illustrating a side flap tucker coöperative with a flap on the receptacle; Fig. 9 is a skeleton view illustrating means for tucking or closing the bottom end flaps of receptacles; Fig. 10 is an enlarged plan view of a portion of Fig. 9; Fig. 11 is an enlarged end view looking from the righthand side of Fig. 9; Fig. 12 is a diagrammatic sectional view substantially on the line 12, 12, in Fig. 10, looking in the direction of the arrow $a$; Fig. 12<sup>a</sup> is a detail of flap tucker; Fig. 13 is an enlarged end view looking from the righthand side of Fig. 1, illustrating mechanism for operating openers or blades for collapsed receptacles or cartons; Fig. 14 is a plan view illustrating the upper part of Fig. 13; Fig. 15 is an enlarged detail face view of one of the receptacle openers and means for operating it, looking at the opener from the lefthand side in Fig. 1; Fig. 16 is a section substantially on the line 16, 16, in Fig. 15; Fig. 17 is a cross section substantially on the line 17, 17, in Fig. 15; Fig. 18 is a detail face view of the opener or blade; Fig. 19 is a side view thereof; Fig. 20 is an enlarged end view of said blade; Fig. 21 is a sectional diagrammatic view of an opener in coöperation with a receptacle; Fig. 22 is an enlarged cross sectional view of the turret and its receivers or chucks for opened receptacles on which the latter are charged; Fig. 23 is an enlarged side view of one of the said turret receivers; Fig. 24 is a plan view thereof; Fig. 25 is a diagrammatic view illustrating release of the jaws of the receiver; Fig. 26 is an enlarged sectional view through a magazine, delivery chute, and charge feeding means for the goods; Fig. 27 is a side view looking from the left in Fig. 26; Fig. 28 is a detail view of agitating means for the goods in the chute; Fig. 29 is a view similar to Fig. 28 but illustrating a different position of the parts; Fig. 30 is an end view looking from the righthand side of Fig. 28; Fig. 31 is an enlarged detail face view illustrating some of the spaced supply chutes for the collapsed receptacles or cartons; Fig. 32 is a diagrammatic view of the delivery end of one of said receptacle chutes, illustrating steps in opening receptacles; Fig. 33 is a cross sectional view illustrating a receptacle or carton in the chute; Fig. 34 is a detail perspective view of one of the receptacles or cartons referred to; Fig. 35 is a sectional diagrammatic view illustrating the first step for extracting a receptacle or carton from its chute; Fig. 36 is a similar view illustrating the receptacle or carton opening blade as having entered and opened the receptacle; and Fig. 37 is a detail sectional view of part of the turret.

Similar numerals of reference indicate corresponding parts in the several views.

The numeral 1 indicates a frame for the machine which may be of any suitable construction, and at 2 are chutes spaced side by side along the machine, providing a supply for receptacles or cartons 3, (Figs. 1, 2, 31 and 36). The receptacles 3 are shown of the collapsed variety stacked in the chutes in such manner as to be fed successively through the several chutes to the delivery portions thereof. Receptacles 3 are shown having end flaps 3$^a$, 3$^b$ and a side flap 3$^c$, at one end, and end flaps 3$^d$, 3$^e$ and a side flap 3$^f$ at the opposite end (Figs. 33 and 34). Each chute 2 has a guide rail or bar 2$^a$ along which the flaps 3$^a$, 3$^c$ of the receptacles 3 slide for guiding purposes. At the delivery end of each chute the machine has a contracted outlet shown provided between spaced guides 4, 5, that are secured to blocks 6 to which the ends of the chutes are attached. The guide 4 has a stop or shoulder 4$^a$ opposing one edge of the lowermost receptacle and guide 5 has a stop or shoulder 5$^a$ opposing the opposite edge of such carton, and at 5$^b$ the guide 5 is inclined outwardly so that the space between the outer portions of the guides 4, 5, is narrower than the space between their opposing stops 4$^a$, 5$^a$ (Figs. 31 and 32), whereby when a collapsed receptacle is drawn sidewise out of the chute by an opener blade 7 within the receptacle the edges of the receptacle will be tilted by said stops whereby the receptacle will be opened and squared in its passage to and within the spaced guides at their outer portions, substantially as illustrated in Fig. 32. The chutes 2 are spaced apart in opposing relation to receivers on a turret as hereinafter explained, and an opener blade 7 is provided for each chute to carry a receptacle from such chute to the corresponding receiver of the turret. The opener blades 7 are operatively supported in such manner as to enter lengthwise into a corresponding receptacle 3, then to move sidewise to drag the receptacles from the chutes into position between the guides 4, 5, to next hold the receptacles while their lower flaps are being closed, to then carry the opened receptacles and deposit them in the corresponding receivers on the turret, to then recede from such receptacles, and move back into position to enter other receptacles at the delivery ends of the chutes, and so on. As there are a multiple of chutes, blades and turret receivers, the blades are arranged to operate together and simultaneously for the different steps of their operation respecting successive receptacles. For such purpose I have shown blades 7 secured by screws 8 to blocks or heads 9 that are integral with or secured to longitudinally disposed toothed racks 10, that are slidably guided in ways or guides in arms 11. The arms 11 are shown provided at their upper ends with heads 11$^a$ which receive the longitudinal bar 12 to which the heads 11$^a$ are secured by screws 13 (Figs. 13 to 17). The bar 12 is rotatively supported on frame 1 by gudgeons 12$^a$ at its ends and is provided with a longitudinal groove 12 slidably receiving a rack bar 14, the teeth of which are in mesh with the teeth of the spaced racks 10, such teeth being so shaped that as the bar 14 is reciprocated longitudinally of the machine the racks 10 and thereby the opener blades 7 will together be reciprocated radially with respect to the turret. The rack bar 14 is provided at its ends with rods 15, 16, journaled axially in the gudgeons 12$^a$ (Figs. 1, 2 and 14). The parts 12 and 14 thus are rockably supported, and the rack 14 is supported to slide. Rod 15 is journaled to a bar 17 as by a screw 18, which bar is connected to a rod 19 slidable in frame 1 to be reciprocated for reciprocating rack 14. The rod 19 is pivotally connected by a pin or pivot 20 with a block 21 (Figs. 13 and 14) received in the forked end 22$^a$ of a rock arm or lever 22, that is pivotally supported at 23 upon bracket 23$^a$ on the main frame. Lever 22 is to be rocked in proper timing for reciprocating rack 14, for which purpose I have shown a cam 24 receiving projection or roller 25 from lever 23, which cam is secured upon shaft 26 suitably journaled on the main frame (Figs. 1 and 13). Said shaft is shown provided with a gear 27 (Fig. 1) in mesh with a gear 29 secured on shaft 30 journaled in the main frame, which gear 29 is in mesh with pinion 28 secured upon power shaft 28$^a$ journaled in the main frame. An arm 31 is secured to bar 12 for rocking it, (Figs. 1, 13 and 14). A suitable link 32 is pivotally connected with said arm and with a rock arm 33 which is pivotally supported upon a fixed bar 34 carried by the frame 1. The portion 33$^a$ of rock arm 33 is shown provided with a projection or roller 35 coöperating with a cam 36 secured on shaft 26, whereby as said cam is rotated the arm 31 and bar 12 will be rocked. To positively lock the arm 31 in set positions during certain operations of the opener blades 7, I have shown the arm 31 provided with spaced recesses 31$^a$ adapted to receive a finger 37 projecting from the rock shaft 38 journaled in frame 1, and provided with a crank arm 39 that is pivotally connected with a rod 40 (Figs. 1, 13 and 14). The rod 40 is what may be termed a two-part rod provided with an interposed spring 41, the lower part of said rod being pivotally connected at 42 with a rock arm 43, that is pivotally supported at 44 upon the main frame. Arm 43 is provided with a projection or roller 45 adapted to coöperate with a cam 46 secured upon shaft 30 (Figs. 1 and 13), whereby as said cam is rotated the finger 37 will be moved into and out of engagement with one or another of the notches 31ª of arm 31. Blades 7 have means for gripping the adjacent walls of receptacles to the blades so that the receptacles may be carried along with the latter. For such purpose I have shown each blade provided with a gripping finger 48, shown having a rounded end and pivotally supported at 49 upon block 50 secured to the blade (Figs. 15, 16, 21). A spring 51 is interposed between said block and finger serving normally to press the latter toward the blade. When the blade descends into a carton a wall of the latter will pass between the blade and its finger 48 whereby the carton will be suspended upon the blade, and when the receptacle 3 has been deposited in the receiver of the turret, and gripped by the jaws of the latter, (as hereinafter explained) the finger 48 will slip off and release the latter from the blade during recession of the latter from the receptacle.

The arrangements described for supporting and operating the opener blades 7 are such that rack 14 will operate to cause the blades to be drawn along the arms 11 toward said rack for clearing the tops of the receptacles 3 in the several chutes when bar 12 is rocked to present blades 7 over the lowermost receptacles in the chutes. Rack 14 next will operate reversely to cause the blades 7 to enter the corresponding receptacles in the chutes, and thereupon bar 12 will be rocked to carry the blades and with them the corresponding receptacles from the ends of the chutes toward the left in Figs. 35 and 36, to place the opened receptacles in the receivers on the turret 47. Rack 14 next will be reciprocated in a reverse direction to cause withdrawal of the blades 7 from the receptacles in said receivers, and bar 12 will again be swung or rocked to carry the blades toward the chutes for again entering receptacles, and so on for each series of receptacles to be transferred from the chutes to the turret. It will be understood that when the blades 7 drag the receptacles from the chutes, the receptacles will be opened and squared in manner before described.

At a suitable distance between the chutes 2 and the turret 47 the receptacles are brought to rest, while carried by the blades 7, for the purpose of folding the lower end flaps 3ª, 3ᵇ and tucking the side flaps 3ᶜ thereof. The flap folding and tucking devices I have illustrated are as follows: A pair of longitudinally reciprocative bars 52, 53 are mounted side by side and are slidable in guides 54 carried by frame 1 (Figs. 1, 2, 9, 12). Pairs of flap closing fingers 55, 56 are respectively secured upon the bars 52, 53, in position to receive between them the end flaps 3ª, 3ᵇ of the receptacles 3 carried by the several opener blades 7, the spaced pairs of fingers being in such position on said bars as to receive between them the said flaps when the corresponding receptacles are brought to rest temporarily between such pairs of fingers in the passage of such receptacles from the chutes toward the turret. For reciprocating the bars 52, 53 and their fingers 55, 56, I provide a rockable arm 57 pivotally supported upon shaft 58 that is journaled in suitable bearings upon the main frame, and each arm at its ends is pivotally connected at 59, 60 with brackets or blocks 61, 62 that are secured respectively to bars 52, 53 (Figs. 10 and 11). Shaft 58 is to be rocked for reciprocating the bars 52, 53, for which purpose I have shown said shaft provided with a crank arm 63 having a projection 64 coöperating with cam 65 secured on shaft 26 (Figs. 2, 9, 10 and 11), whereby, as said shaft is rotated, shaft 58 will be rocked to cause reciprocations in opposite directions of the bars 52, 53, and the corresponding fingers 55, 56. To tuck and close the end flaps 3ᶜ of the receptacles 3 approximately while their corresponding side flaps 3ª, 3ᵇ are being folded I provide a bar 66 parallel with and adjacent to bar 53, the bar 66 being guided at its ends for lateral movement (Figs. 9 and 10). The bar 66 is beneath the operative portion of fingers 55, 56 and carries flap tuckers 68 that are spaced apart upon said bar corresponding to and in a position operative between the corresponding pairs of fingers 55, 56. Said flap tuckers 68 are provided with upper V-like recesses 68ª into which the depending flaps 3ᶜ of receptacles 3 are adapted to enter, whereby said flaps will be properly bent and tucked into the corresponding ends of the receptacles when bar 66 rises. To reciprocate bar 66 with its flap tuckers in proper timing with respect to the operation of fingers 55, 56, I have shown the end portions of bars 66 provided with depending arms 67 pivotally connected at 69 with links 70 that are pivotally connected at 71 with crank arms 72, that are secured to shaft 74 (Figs. 2, 9, 10, 11). The arm 72ª is shown provided with projection or roller 75 to coöperate with cam 76 that is secured upon shaft 26, whereby as said cam is rotated the bar 66 will be raised and lowered. The relation and timing of the flap closing devices described are such that when receptacles 3 with their lower projecting flaps 3ª, 3ᵇ, 3ᶜ are moved from the corresponding chutes 2 by the corresponding blades 7, and are brought to rest between the corresponding pairs of fingers 55, 56, which are then separated (Fig. 10), the bars 52, 53 then will be moved in opposite directions to cause the fingers 55, 56 to approach to fold the end flaps 3ª, 3ᵇ against the ends of the receptacles respectively, and said fingers will recede, and the bar 66 will be raised to permit its flap folders and tuckers 68 to engage the depending flaps 3ᶜ to cause the end portions thereof to be bent and the flaps to be tucked into the ends of the corresponding receptacles 3 (Fig. 12ª), over the previously folded end flaps 3ª, 3ᵇ, and thereupon the bar 66 will recede.

The next step of the blades will carry the receptacles 3 (having the last named flaps folded and closed) to a position to deposit the receptacles in the receivers of the turret 47. The turret 47 is shown hollow and provided with hollow hubs 47ᵇ journaled in bearings on the main frame (Fig. 37). The turret has spaced radial openings 47ª (Fig. 3), opposing each of which openings a receiver for the receptacles 3 is located. The receivers comprise opposing spaced jaws 77 shown in rectangular form having the closed bottoms 77ª and their tops and one side portion are open to receive the receptacles 3 therein in a lateral direction, whereby the open ends of the receptacles are projected outwardly (Figs. 3, 22 and 25). The jaws 77 of each receiver are carried by a slidable head 78 that is guided in a bushing 79 extending into a corresponding opening 47ª of the turret and secured to the turret by screws 80. The jaws 77 with their heads 78 are resiliently retained on bushing 79 by means of springs 81 that connect said jaws with the corresponding bushing. The open sides of the receivers face in the direction of the opposing blades 7 to receive receptacles 3 therefrom, and at 82 are receptacle retaining dogs which are pivotally supported at 83 upon the corresponding jaw 77, (Fig. 24). Springs at 84 are interposed between the heel 82ª of a dog 82 and the corresponding jaw 77, whereby the jaws are normally maintained in position to retain a receptacle in the receiver, and may spread with the jaws to admit receptacles. The turret 47 is rotated step by step in consonance with the operation of blades 7, and the receivers are spaced along the periphery of the turret corresponding to the blades 7, whereby each time the turret comes to rest a series of receivers will be brought into position opposing the series of blades 7 for receiving a multiple of receptacles 3 from the blades simultaneously and in a successive manner. I provide means to agitate the receivers for agitating the receptacles therein in the position of being charged with goods to cause settlement of the goods in the receptacles, and for such purpose a cam 121ª for each annular series of receivers is secured upon transverse shaft 121, that extends through the turret (Fig. 22). As each longitudinal series of receivers along the turret is brought to rest in the receptacle charging position, over corresponding cams 121ª, the latter will operate the heads 78 to move them outwardly against the resistance of the springs 81, whereby said heads with the receivers and receptacles will be agitated in a longitudinal direction. Means for rotating shaft 121 and the cams 121ª will be described hereinafter.

Any suitable means may be provided for rotating the turret, and as a convenient means for the purpose I have shown a Geneva movement comprising a slotted member 85 secured to the turret and operated by a projection or roller 86 from an arm 87 of said movement, which arm is secured on rod 30, whereby each time said arm is rotated the Geneva member 85 and the turret may be rotated a step and brought to rest with a series of receivers opposing the blades 7 and cams 121ª. The turret may be retained locked in each position in which the receptacles 3 are charged, by means of a wheel or disk A having spaced recesses B adapted to receive a projection C on an arm D pivotally supported upon the frame at $d$, which arm is provided with a roller or projection E coöperative with a cam member F carried by shaft 26 (Fig. 2). The arrangement is such that each time that the turret is brought to rest by the Geneva movement, the projection C will enter a recess B of wheel or disk A to retain the turret from movement, and just before the turret is to be stepped forwardly the cam F will operate lever D to withdraw the projection C from disk A, and while said projection is so withdrawn the turret may be operated a step and so on. Means are provided for charging the successive series of receptacles on the turret, for closing the upper flaps of the charged receptacles, and for ejecting the charged receptacles from the turret, all in a successive manner. At a suitable position, spaced in relation to the position in which the receptacles 3 are inserted in the receivers of the turret, I provide means for charging a series of receptacles simultaneously, as follows: A magazine or hopper for the goods or articles to be charged is indicated at 88, and is suitably supported upon the main frame, beneath which hopper a series of chutes or funnels 89 depend over the turret in position to deliver articles into the receptacles 3 in the receivers therebeneath. Each chute 89 has a lower discharge gate 90 that is secured to and between spaced arms 91 that are pivotally supported at 92 adjacent a corresponding chute. Said arms are adapted to be operated by a cam 93 secured to a shaft 94 journaled in suitable bearings supported upon the main frame (Figs. 1, 26, 27). The shaft 94 extends lengthwise of the machine and is provided with a cam 93 for each chute 89 and its gate 90. Above the gate 90 each chute 89 is provided with transversely operated charge-measuring fingers 95 adapted to reciprocate in openings 96 in the wall of the chute. The fingers 95 in each chute are carried by a slide 97 that is slidable in a bore in a block 98 secured between or formed with arms 99 that are pivotally supported at 100 upon the corresponding chute 89. A spring 95ª normally presses the fingers 95 toward the chute (Fig. 26). A spring 101 (Fig. 27) connects arms 91 and 99 to return them to normal position. The cam 93 coöperates with arms 99 for rocking them. The arrangement is such that a charge of goods will be retained in chute 89 between its discharge jaw 90 and the fingers 96, and when a charge is to be delivered into a receptacle beneath a chute 89 the cam 93 will retain fingers 95 projected into the chute to retain goods thereabove, and gate 90 will be swung away to discharge into the receptacle the goods beneath said fingers. On return rotation of shaft 94 the gate 90 will swing back to close the chute and thereupon the fingers 95 will be drawn out to permit the descent of goods upon the gate and the fingers will then be returned into the chute, there to remain during the next opening of the gate 90, and so on for each charge of goods to successive receptacles. The gates and fingers of the several chutes 89 will operate simultaneously, in the manner described, for charging the multiple of receptacles 3 simultaneously, corresponding operations taking place each time a series of receptacles are brought to rest between the several chutes 89. The shaft 94 may be operated in any suitable manner. I have shown an arm 102 that is secured to said shaft and is pivotally connected with a link 103, that is pivotally connected with a crank arm 104 (Figs. 1 and 26) pivotally supported at 105 on the main frame, which crank arm is pivotally connected by a link 106 with a rock arm 107 pivotally connected at 108 with the main frame (Fig. 1). Arm 108 is provided with a projection or roll 109 coöperative with a cam 110 on shaft 111 journaled upon the main frame. A gear 112 on said shaft is in mesh with gear 29, whereby as shaft 111 is rotated the shaft 94 will be rocked.

In order to agitate the articles in the chutes 89, one wall 89ª of each chute is made movable (Fig. 26), and said movable walls have clamping devices 113 secured to a transverse rod or pipe 114 that passes along behind all of the chutes. At opposite ends of said rod transverse arms 115 are slidable in ways in guides 114ª secured at the ends of rod 114, (Figs. 1, 2, 26, 28, 29). Arms 115 have depending projections 116, guided in keepers 117 on the main frame. Said arms are normally pressed down by springs 118, and projections 116 have rollers 119 coöperative with cams 120, on shaft 121, journaled on the main frame. Said shaft may be rotated by a sprocket wheel 122 receiving a chain 123 passing over a sprocket wheel 124 secured on shaft 28ª. When said cams 120 are rotated the arms 115 will be caused to rise and descend for raising and lowering the walls 89ª of the chutes 89. A lateral motion is also imparted to said walls by reason of rock arms 125 pivoted at 126 upon the main frame (Figs. 1 and 2), the upper ends of which arms are forked at 125ª and receive blocks 127 that are pivotally connected with guide 114ª (Figs. 26, 28, 29). The lower ends of arms 125 coöperate with the cams 120 and a spring $a$ bearing against arm 125 and against stop $b$ on the main frame serves normally to move said arm toward the cam and for coöperation therewith, (Fig. 2). During rotation of said cams the arms 25 would be rocked to move rod 114 and with it the walls 89ª laterally, while the cams 120 also raise and lower rod 114 and with it the walls 89ª so that the latter are agitated vertically and laterally continuously for agitating the goods in the chutes 89.

After the receptacles on the turret have been charged the turret is moved a step and brought to rest in such a position that the flaps 3ᵈ, 3ᵉ and 3ᶠ at the upper ends of the receptacles 3 will be closed, for which purpose I have illustrated the following arrangement: Spaced parallel bars 130, 131 are slidably supported at their ends in guides 132 on the main frame, which bars are provided with pairs of lateral fingers 133, 134, adapted to receive therebetween the upper end flaps 3ᵈ, 3ᵉ, of the receptacles 3. The pairs of fingers 133, 134, are spaced apart corresponding to the spacing of the receivers along the turret and with respect to the spacing of blades 7, so that as the turret carries the charged receptacles toward said flap closing fingers the flaps 3ᵈ, 3ᵉ will be brought to rest between pairs of such fingers, which then will be separated (Fig. 4). The bars 130 and 131 are reciprocated to cause the fingers 133, 134 to approach to fold the flaps 3ᵈ, 3ᵉ (Fig. 7) and to recede to the flap receiving position. Said bars are shown pivotally connected at 130ª, 131ª respectively with a rock arm 135 secured upon shaft 136 journaled in suitable bearings upon frame 1 (Figs. 3 and 4). Said shaft is provided with an arm 137 having a projection or roller 138 coöperative with cam 139 secured upon shaft 111, whereby as said cam is rotated the bars 130 and 131 will be simultaneously moved in opposite directions. When said bars are moved so that the fingers 133, 134 approach, said fingers will engage the top end flaps 3ᵈ, 3ᵉ of corresponding receptacles 3 to fold in or close said flaps (Fig. 7) and when said fingers recede the receptacles will be released therefrom. Means are also provided for folding and tucking the flaps 3ᶠ of each series of receptacles simultaneously, for which purpose I have shown flap folders and tuckers 140, which are supported to swing laterally as well as to slide toward and from the corresponding receptacles (Figs. 3, 5, 6, and 8). The flap tuckers 140 are secured to and project from the cross bar 141 which is secured at its end portions to transverse rack bars 142 slidable in bearings in blocks or boxes 143 suitably journaled upon the main frame (Figs. 3 and 5). A transverse bar 144 is carried by the blocks 143 and is provided with a longitudinal groove 144ª in which a rack bar 145 is slidably reciprocative. Rack bar 145 is in mesh with rack bars 142 whereby as the bar 145 is reciprocated the rack bars 142 will be reciprocated at a right angle thereto to reciprocate the flap tuckers 140. The rack bar 145 is pivotally connected at 146 with a rock arm 147 connected with a shaft 148 journaled in suitable bearings upon the main frame (Figs. 2 and 3). Said shaft is provided with an arm 149 having a projection 150 coöperative with a cam 151 secured on shaft 111, whereby as said cam is rotated the rack 145 will be reciprocated to correspondingly reciprocate the racks 142 and thereby the flap closers and tuckers 140. The bar 144 is rocked for swinging the flap closers 140 and with relation to the longitudinal movement of the latter, for which purpose bar 144 is provided with an arm 152 (Figs. 2 and 3) that is pivotally connected by a link 153 that is pivotally connected with a rock arm 154 pivotally supported on the main frame, which arm has a projection or roller 155 coöperative with a cam 156 secured on shaft 111. The arrangement is such that as shaft 111 is rotated, the cam 156 will cause bar 144 to rock to present the flap closers and tuckers 140 opposing the series of charged receptacles 3 on a turret, the flap tuckers moving from the full line to the dotted line positions shown in Fig. 5, whereby the flaps 3ᶠ will oppose the tuckers 140 (Fig. 8), whereby the cam 151 will cause rack 145 to move longitudinally, to cause the racks 142 with the tuckers 140 to be moved toward the receptacles, whereupon the tuckers will cause folding of the end portions of flaps 3ᶠ (Fig. 8), and the tucking of said flaps into the receptacles, and thereupon rack 145 will be moved reversely to cause withdrawal of the tuckers 140 from the receptacles and the bar 144 will be rocked reversely to return the tuckers to the idle position (Fig. 5), and so on successively each time a series of charged receptacles are brought from under the chutes 89 in position with relation to the tuckers 140.

During a further or succeeding step of the turret the charged and closed receptacles 3 are brought to position for discharging them from the receivers of the turret, and for such purpose I have shown an ejector for each annular series of receivers, comprising an arm 157 pivotally supported at 158 upon the main frame (Fig. 2) and provided with an ejector finger 159 (Fig. 22) adapted to pass behind the corresponding receptacle 3, so that when said ejector arm is swung to the right in Fig. 22 the receptacles will be discharged from the receivers. The fingers 159 are adapted to pass in the space between the respective receiver jaws 77 to push receptacles from the receivers, and the head portion 157ª of the ejector arm is adapted to encounter the heels 82ª of the dogs 82, to cause the latter to separate to release a receptacle from a corresponding receiver. The ejectors are suitably spaced apart and all operate together by being secured upon a single shaft 158. The latter is provided with an arm 160 pivotally connected with forked member 161 whose fork receives shaft 111, a projection 162 on said member being coöperative with a cam 163 secured upon shaft 111 (Figs. 2, 3,) whereby as said cam is rotated said ejectors will be rocked. In the inoperative position shown in Fig. 22 the ejectors are so located that when the turret rotates and carries a series of charged receptacles toward the ejector fingers the latter will be behind the ends of the receptacles, and the turret will come to rest, but before the turret comes to rest the heels 82ª will engage the heads 157ª to cause spreading of the jaws 82 for release of the charged receptacles, and thereupon the ejectors will advance in the direction of the arrow in Fig. 22, to eject charged receptacles 3 in a longitudinal direction from the receivers of the turret. The ejectors will next return ready to receive the succeeding receptacles for discharging them from the receivers, and so on successively. At 164 is a suitable chute or receiver for the charged receptacles which will be delivered thereto by the ejectors (Fig. 2).

The complete operation may be described as follows: The receptacles 3 will be supplied in the several chutes 2, and articles will be placed loosely in bulk in the hopper 88 and will descend into the chutes 89 to rest upon fingers 95. When the machine operates blades 7 will oppose the lowermost receptacles in chutes 2 and said blades will be moved forwardly into such receptacles and then the blades will swing toward the turret, causing the opening of the receptacles as they are dragged from the chutes, and the blades will come to rest. The flap closers 55, 56 and 68 will then operate to close flaps at the lower ends of the receptacles, and thereupon the blades 7 will swing to carry the receptacles into the receivers of the turret, and the blades will be withdrawn from the receptacles to return to position for another supply of receptacles, and so on. The turret will then rotate a step to present the receptacles thereon under the chutes 89. When the turret is at rest gates 90 will open and the charge below the fingers 55 will be deposited from the chutes 89 into the corresponding receptacles on the turret, the gates 90 and fingers 95 operating in proper order for the several successive charges of the articles. While the receptacles are being charged, the cams 121ª will cause agitation of the receivers and receptacles thereon, whereby the articles will be snugged in the receptacles. (While one series of receptacles are being charged, blades 7 will apply a successive series of receptacles to the succeeding receivers of the turret, and so on). When a series of receptacles have been charged the turret will step forwardly to carry such charged receptacles into position for closing of their upper flaps, and the turret will present another succeeding series of receptacles into charging position. The flap closers 133, 134 and 140 will then operate to close the upper flaps of the charged receptacles, during which time another series of receptacles will be charged. When said flaps have been closed and the flap closers 133, 134 and 140 have moved away from such receptacles, the now fully charged and closed receptacles upon the next step of the turret will be advanced to the ejectors, and as the receptacles reach the ejectors the jaws 82 will open and thereupon the ejectors will be operated to push the charged receptacles from the receivers of the turret simultaneously. It will thus be understood that, in accordance with the arrangements described, several operations are being performed at substantially the same time with respect to different successive series of receptacles, with the result that for each step of the turret a series of charged and closed receptacles are discharged from the machine. The operation of opening, charging and closing receptacles in accordance with my improvements is expeditious, in that a multiple of receptacles or cartons are simultaneously opened, their flaps at one end simultaneously closed, they are simultaneously placed in position for charging and charged, their remaining flaps are simultaneously closed, and the charged receptacles are simultaneously delivered from the machine, and the capacity of the machine will be in accordance with the number of blades, receivers of the turret, corresponding flap closing means, and corresponding ejectors for the charged receptacles or cartons.

While I have illustrated and described a particular arrangement of parts, whereby the multiple opening, charging and closing of receptacles or cartons is effected, changes may be made in the arrangements of parts set forth, within the scope of the appended claims, without departing from the spirit of my invention.

Having now described my invention what I claim is:—

1. A machine of the class described comprising a plurality of spaced supplies for receptacles, a plurality of blades corresponding to said supplies, a plurality of receivers opposing and corresponding to said blades, means to simultaneously operate said blades for simultaneous removal of receptacles from said supplies, means to simultaneously close flaps of said receptacles while retained by said blades, said blade operating means being operative to place the receptacles in the receivers, and means to simultaneously charge said receptacles while in said receivers.

2. A machine of the class described comprising a plurality of spaced supplies for receptacles, a plurality of blades corresponding to said supplies, a plurality of receivers opposing and corresponding to said blades, means to simultaneously operate said blades for simultaneous removal of receptacles from said supplies, means to simultaneously close flaps of said receptacles while retained by said blades, said blade operating means being operative to place the receptacles in the receivers, means to simultaneously charge said receptacles while in said receivers, and means to simultaneously close flaps at the charging ends of said receptacles.

3. A machine of the class described comprising a plurality of spaced supplies for receptacles, a plurality of blades corresponding to said supplies, a plurality of receivers opposing and corresponding to said blades, means to simultaneously operate said blades for simultaneous removal of receptacles from said supplies, means to simultaneously close flaps of said receptacles while retained by said blades, said blade operating means being operative to place the receptacles in the receivers, means to simultaneously charge said receptacles while in said receivers, means to simultaneously close flaps at the charging ends of said receptacles, and means to simultaneously discharge the charged receptacles from the receivers.

4. A machine of the class described comprising a plurality of spaced supplies for collapsed receptacles, a plurality of blades corresponding to said supplies, means to cause the blades to enter corresponding receptacles in a longitudinal direction, means to cause the blades to swing laterally to carry the receptacles from the corresponding supplies, guides for the passage of said receptacles with the blades to square the receptacles, a plurality of receivers opposing said blades, said blades operating to deposit opened receptacles from said guide in corresponding receivers, said first named blade operating means serving to withdraw the blades from the receptacles in the receivers, and means to simultaneously charge the opened receptacles while in said receivers.

5. A machine of the class described comprising a plurality of spaced supplies for collapsed receptacles, a plurality of blades corresponding to said supplies, means to cause the blades to enter corresponding receptacles in a longitudinal direction, means to cause the blades to swing laterally to carry the receptacles from the corresponding supplies, guides opposing said supplies and having widened portions adjacent the supplies and narrower portions beyond to square the receptacles passing through the guides, a plurality of receivers opposing said blades, said blades operating to deposit opened receptacles in corresponding receivers, said first named blade operating means serving to withdraw the blades from the receptacles in the receivers, means to simultaneously charge the opened receptacles while in said receivers, and means to close flaps at the charging ends of the charged receptacles.

6. A machine of the class described comprising a plurality of spaced supplies for collapsed receptacles, a turret spaced from said supplies and having a series of spaced receivers corresponding to said supplies, means to simultaneously transfer receptacles from said supplies to said receivers, means to simultaneously charge the receptacles in said receivers, and means to rotate said turret to present successively series of receptacles in charging position.

7. A machine of the class described comprising a plurality of spaced supplies for receptacles, a plurality of blades corresponding to said supplies, a turret having spaced receivers corresponding to said blades and supplies adapted to receive said receptacles, said receivers having open sides to receive said receptacles and having dogs to retain the receptacles in the receivers, means to cause the blades to simultaneously remove receptacles from said supplies and place the receptacles in said receivers, means to simultaneously charge receptacles in said receivers, means to rotate the turret step by step, and means to cause opening of said dogs to release the charged receptacles.

8. A machine of the class described comprising a plurality of spaced supplies for receptacles, a plurality of blades corresponding to said supplies, a turret having spaced receivers corresponding to said blades and supplies adapted to receive said receptacles, said receivers having open sides to receive said receptacles and having dogs to retain the receptacles in the receivers, means to cause the blades to simultaneously remove receptacles from said supplies and place the receptacles in said receivers, means to simultaneously charge receptacles in said receivers, means to rotate the turret step by step, means to cause opening of said dogs to release the charged receptacles, ejectors to discharge receptacles from the receivers, and means to simultaneously operate said ejectors.

9. A machine of the class described comprising a plurality of spaced supplies for collapsed receptacles, a plurality of blades corresponding to said supplies and having means to retain receptacles thereon, a plurality of receivers corresponding to said blades to receive receptacles therefrom, said receivers having dogs to retain the receptacles in the receivers, means to cause withdrawal of the blades from said receptacles while in the receivers, and means to charge said receptacles in said receivers.

10. A machine of the class described comprising a plurality of spaced supplies for collapsed receptacles, a plurality of blades corresponding to said supplies and having means to retain receptacles thereon, a plurality of receivers corresponding to said blades to receive receptacles therefrom, said receivers having dogs to retain the receptacles in the receivers, means to cause withdrawal of the blades from said receptacles while in the receivers, means to charge said receptacles in said receivers, and means to simultaneously discharge charged receptacles from the receivers.

11. A machine of the class described comprising a chute for collapsed receptacles, spaced guides opposing the chute having a widened inner portion and narrower outer portion, a blade, means to cause the blade to enter the collapsed receptacles in the chute, means to cause the blade to swing sidewise to drag the receptacles from the chute through said guides and simultaneously open the receptacles in their passage through the guides, a receiver opposing said blade, said blade operating means serving to cause the blade to deposit receptacles in the receiver and to recede from the receptacle therein, and means to charge the receptacles in the receiver.

12. A machine of the class described comprising a plurality of spaced chutes for collapsed receptacles, said chutes having contracted outlets, a plurality of blades corresponding to said chutes, means to cause the blades to enter the collapsed receptacles in the chutes, means to cause the blades to swing sidewise to drag the receptacles from the chutes and simultaneously open the receptacles, means opposing said chutes and spaced apart for closing flaps at one end of said receptacles while they are retained by said blades, a plurality of spaced receivers opposing said flap closing means and spaced therefrom, said blade operating means serving to cause the blades to deposit receptacles in the receivers with the closed ends of the receptacles located inwardly in the receivers, and means to simultaneously charge said receptacles while in the receivers.

13. A machine of the class described comprising a plurality of spaced chutes for collapsed receptacles, said chutes having contracted outlets, a plurality of blades corresponding to said chutes, means to cause the blades to enter the collapsed receptacles in the chutes, means to cause the blades to swing sidewise to drag the receptacles from the chutes and simultaneously open the receptacles, means opposing said chutes and spaced apart for closing flaps at one end of said receptacles while they are retained by said blades, a plurality of spaced receivers opposing said flap closing means and spaced therefrom, said blade operating means serving to cause the blades to deposit receptacles in the receivers with the closed ends of the receptacles located inwardly in the receivers, means to simultaneously charge said receptacles while in the receivers, means to simultaneously move charged receptacles from the charging position, and means to simultaneously close flaps at the charged ends of said receptacles.

14. A machine of the class described comprising a plurality of spaced chutes for collapsed receptacles, said chutes having contracted outlets, a plurality of blades corresponding to said chutes, means to cause the blades to enter the collapsed receptacles in the chutes, means to cause the blades to swing sidewise to drag the receptacles from the chutes and simultaneously open the receptacles, means opposing said chutes and spaced apart for closing flaps at one end of said receptacles while they are retained by said blades, a plurality of spaced receivers opposing said flap closing means and spaced therefrom, said blade operating means serving to cause the blades to deposit receptacles in the receivers with the closed ends of the receptacles located inwardly in ends of the receivers, means to simultaneously charge said receptacles while in the receivers, means to simultaneously move charged receptacles from the charging position, means to simultaneously close flaps at the charged ends of said receptacles, and means to simultaneously discharge the charged and closed receptacles from the receivers.

15. A machine of the class described comprising a plurality of spaced receivers, means to simultaneously insert opened receptacles in said receivers, a supply for articles opposing the receivers and receptacles therein, chutes from said supply respectively opposing the corresponding receptacles in the receivers to direct charges therein, said chutes having means to simultaneously discharge charges therefrom into corresponding receptacles, said chutes having movable walls, means to operate said walls to agitate charges in the chutes, and means to simultaneously remove charged receptacles from said receivers.

16. A machine of the class described comprising a plurality of spaced receivers, means to simultaneously insert opened receptacles in said receivers, a supply for articles opposing the receivers and receptacles therein, chutes from said supply respectively opposing the corresponding receptacles in the receivers to direct charges therein, said chutes having means to simultaneously discharge charges therefrom into corresponding receptacles, said chutes having movable walls, means to operate said walls to agitate charges in the chutes, means to simultaneously remove charged receptacles from said receivers, and means to simultaneously close flaps at charging ends of said receptacles.

17. A machine of the class described comprising a plurality of spaced chutes for collapsed receptacles, said chutes having contracted outlets, a plurality of blades corresponding to said chutes, racks connected with said blades, arms slidably receiving said racks, a rack transverse to the first named racks and in mesh with all of them, a bar slidably receiving said transverse rack, means rockably supporting said bar, and means to reciprocate the transverse rack to cause reciprocations of the blades, means to rock the bar to cause swinging movement of the blades, a plurality of rows of spaced receivers corresponding to said blades, means to present successive rows of blades simultaneously opposing said blades to receive receptacles therefrom, and means to simultaneously charge receptacles on said receivers.

18. A machine of the class described comprising a plurality of spaced chutes for collapsed receptacles, said chutes having contracted outlets, a plurality of blades corresponding to said chutes, racks connected with said blades, arms slidably receiving said racks, a rack transverse to the first named racks and in mesh with all of them, a bar slidably receiving said transverse rack, means rockably supporting said bar, and means to reciprocate the transverse rack to cause reciprocations of the blades, means to rock the bar to cause swinging movement of the blades, a plurality of rows of spaced receivers corresponding to said blades, means to present successive rows of blades simultaneously opposing said blades to receive receptacles therefrom, means to simultaneously charge receptacles on said receivers, and means to simultaneously close flaps of said receptacles.

19. A machine of the class described comprising a rotative turret having annular series of receivers spaced along the turret, means movably supporting the receivers of the turret, means to supply receptacles to said receivers, means to simultaneously charge a plurality of receptacles in said receivers, means to reciprocate said receivers and agitate articles in the receptacles thereon, and means to rotate said turret step by step.

20. A machine of the class described comprising a rotative turret having annular series of receivers spaced along the turret, means movably supporting the receivers on the turret, means to supply receptacles to said receivers, means to simultaneously charge a plurality of receptacles in said receivers, means to reciprocate said receivers and agitate articles in the receptacles thereon, means to rotate said turret step by step, and means to simultaneously close flaps at the charging ends of the charged receptacles.

Signed at New York city in the county of New York and State of New York this 28th day of December A. D. 1917.

ERNEST D. ANDERSON.

Witnesses:
T. F. BOURNE,
MARIE F. WAINRIGHT.